United States Patent

Eguchi

[11] Patent Number: 5,973,467
[45] Date of Patent: Oct. 26, 1999

[54] VELOCITY CONTROL DEVICE USING SERVO MOTOR

[75] Inventor: Satoshi Eguchi, Niwa-gun, Japan

[73] Assignee: Okuma Corporation, Nagoya, Japan

[21] Appl. No.: 09/099,450

[22] Filed: Jun. 18, 1998

[30] Foreign Application Priority Data

Jun. 30, 1997 [JP] Japan ................................ 9-173391

[51] Int. Cl.[6] .............................................. G05B 11/36
[52] U.S. Cl. .................. 318/609; 318/568.22; 318/632; 318/611; 364/157; 364/161
[58] Field of Search ................. 364/157, 148.01, 364/149, 150, 160–163; 318/568.22, 569, 560, 561, 600–601, 606–610, 611, 615–616, 632

[56] References Cited

U.S. PATENT DOCUMENTS

| | | | |
|---|---|---|---|
| 4,679,136 | 7/1987 | Shigemasa | 364/150 |
| 4,992,715 | 2/1991 | Nakamura et al. | 318/649 |
| 5,111,124 | 5/1992 | Kurosawa | 318/434 |
| 5,157,597 | 10/1992 | Iwashita | 364/157 |
| 5,311,110 | 5/1994 | Iwashita | 318/568.15 |
| 5,384,525 | 1/1995 | Kato | 318/610 |
| 5,397,973 | 3/1995 | Dummermuth | 318/628 |
| 5,475,291 | 12/1995 | Yoshida et al. | 318/568.22 |
| 5,517,100 | 5/1996 | Matsubara et al. | 318/632 |
| 5,581,167 | 12/1996 | Kato et al. | 318/609 |
| 5,598,077 | 1/1997 | Matsubara et al. | 318/568.22 |
| 5,691,615 | 11/1997 | Kato et al. | 318/609 |
| 5,737,483 | 4/1998 | Inaji et al. | 318/632 |
| 5,742,138 | 4/1998 | Kato et al. | 318/570 |
| 5,812,428 | 9/1998 | Zou et al. | 318/561 |
| 5,880,415 | 3/1999 | Colby et al. | 318/609 |

*Primary Examiner*—David Martin
*Attorney, Agent, or Firm*—Oliff & Berridge, PLC

[57] ABSTRACT

A velocity control device controls a velocity of an object via a servo motor so that a damping phenomenon during acceleration or deceleration and a swelling phenomenon of a specified frequency arising at a specified velocity are relieved, while disturbance suppression ability is improved under a wide range of low accelerations. The device comprises an integral gain variable calculation section including an acceleration variable section for calculating an acceleration variable integral gain from an acceleration factor according to an acceleration command value and a reference integral gain and a weighting calculation section for calculating an integral gain from a weighting factor according to a velocity command value, a reference integral gain, and an acceleration variable integral gain. The device may therefore variably set an integral gain according to an acceleration command value and a velocity command value.

3 Claims, 5 Drawing Sheets

VELOCITY CONTROL DEVICE USING SERVO MOTOR

BACKGROUND OF THE INVENTION

1. Field of the Invention

The present invention relates to a velocity control device applied to a velocity control system, for example, a numeral control machine.

2. Description of the Related Art

FIG. 6 is a block diagram of a conventional velocity control device which controls a velocity of an object mechanically connected to a motor, by controlling a velocity of a servo motor. To a velocity control device 1, a velocity command value V is supplied by a precedent command device (not shown in the figure). A subtracter 100 subtracts a motor velocity vm from the velocity command value V and calculates a velocity deviation V−vm. Here, the velocity deviation is amplified by an operation of PI (proportional integration) amplification described below, and becomes a torque command value τc. The velocity deviation V−vm is amplified by a factor of a proportional gain Kp in an amplifier 101 and produces a proportional component τp. Furthermore, the velocity deviation is amplified by a factor of an integral gain Ki in an amplifier 102 and becomes d τi/dt, is integrated in an integrator 103, and produces an integral component τi. The τp and the τi are added together in an adder 104 to become a torque command value τC.

A power amplifying section 105 is comprises an electric power amplifier (not shown in the figure) and a servo motor (also not shown), and is a section to amplify a torque command value τc to a motor output torque τ, and the amplification factor thereof is expressed by a torque conversion constant Ct. An object system 107 comprises a motor and a controlled object (not shown in the figure) mechanically connected to the motor. A disturbance torque τd is a disturbance torque acting on the object system from outside, and is added to the motor output torque τ in an adder 106 shown equivalently, and finally, a torque acted on the object system becomes τ+τd. A position detector (not shown in the figure) or a velocity detector (not shown in the figure) is connected to the motor and, on the basis of the detected information thereof, a motor velocity vm showing a velocity of a controlled object can be obtained.

Here, provided that the controlled object is a rigid body and the motor and the controlled object are rigidly connected, by using a total inertia moment J of the motor and the controlled object, a velocity response of a conventional velocity control device 1 shown in FIG. 6 can be expressed by the following expression.

Expression 1

$$\{(V-vm)Kp+\int Ki(V-vm)dt+\tau i(0)\}Ct+\tau d=J(dvm/dt)$$

when τi(0)=vm(0)=0 are initial conditions, when Laplace transformation is carried out, the following expression can be obtained from Expression 1 (wherein S shows an operator of Laplace transformation indicating a derivative action, and ^2 shows square).

Expression 2

$$vm(S) = [\{(KpCt/J)S + (KiCt/J)\}/$$
$$\{S^{\wedge}2 + (KpCt/J)S + ((KiCt/J)\}]V(S) + [(S/J)/$$
$$\{S^{\wedge}2 + (KpCt/J)S + ((KiCt/J)\}]\tau d(S)$$

Here, a damping factor ζ of a generally used normal quadratic form and a natural frequency ωn of the system are defined as follows (wherein { }^(½) shows the one-half power of { }).

Expression 3

$$\zeta=(Kp/2)\{Ct/(Ki\cdot J)\}^{\wedge}(½)$$

$$\omega n=\{KiCt/J\}^{\wedge}(½)$$

If Expression 2 is expressed, being divided into a command response characteristic when letting τd=0, and a disturbance suppression characteristic when letting V=0, it becomes the following expressions.

Expression 4

$$vm(S)=[\{2\zeta\omega nS+\omega n^{\wedge}2\}/\{S^{\wedge}2+2\zeta\omega nS+\omega n^{\wedge}2\}]V(S)$$

Expression 5

$$vm(S)=[(S/J) \{S^{\wedge}2+2\zeta\omega nS+\omega n^{\wedge}2\}]\tau d(S)$$

That is, as for a conventional velocity control device shown in FIG. 6, Expression 4 expresses the command response characteristic and Expression 5 expresses the disturbance suppression characteristic.

From the above description, it is clear that in a velocity control device, a command response characteristic and a disturbance suppression characteristic can be variable by operating a proportional gain Kp and an integral gain Ki, and it is further clear from Expression 5 that setting a large integral gain Ki is effective for improving disturbance suppression ability. However, if an integral gain Ki is simply set large, a damping factor ζ is simultaneously lowered and, therefore, damping characteristics of the command response characteristic shown by Expression 4 are worsened. Moreover, since a reduced damping factor arises under certain frequencies, swelling phenomena of a specified frequency at a specified velocity have an arisen under the influence of rotational errors or the like of a position detector having a frequency proportional to the velocity.

SUMMARY OF THE INVENTION

The present invention is made to address these problems, and an object of the present invention is to provide a velocity control device, by which a damping phenomenon at the time of acceleration or deceleration and a swelling phenomenon of a specified frequency arising at a specified velocity, produced as harmful effects because of setting an integral gain Ki to be large, are relieved, and disturbance suppression ability may be improved under the condition of low acceleration excluding said specified velocity and including a wide range of constant velocities.

The present invention relates to a velocity control device which controls a velocity of a controlled object via a servo motor, and the object of the present invention is achieved by having an integral gain variable calculation section comprise of an acceleration variable section which determines an acceleration factor according to an acceleration command value and which calculates an acceleration variable integral gain from a reference integral gain and the acceleration factor, and a weighting calculation section which determines a weighting factor according to a velocity command value and finally determines an integral gain at the time of velocity control calculation from the reference integral gain and said acceleration variable integral gain and weighting factor.

DESCRIPTION OF PREFERRED EMBODIMENT

Figure 1:
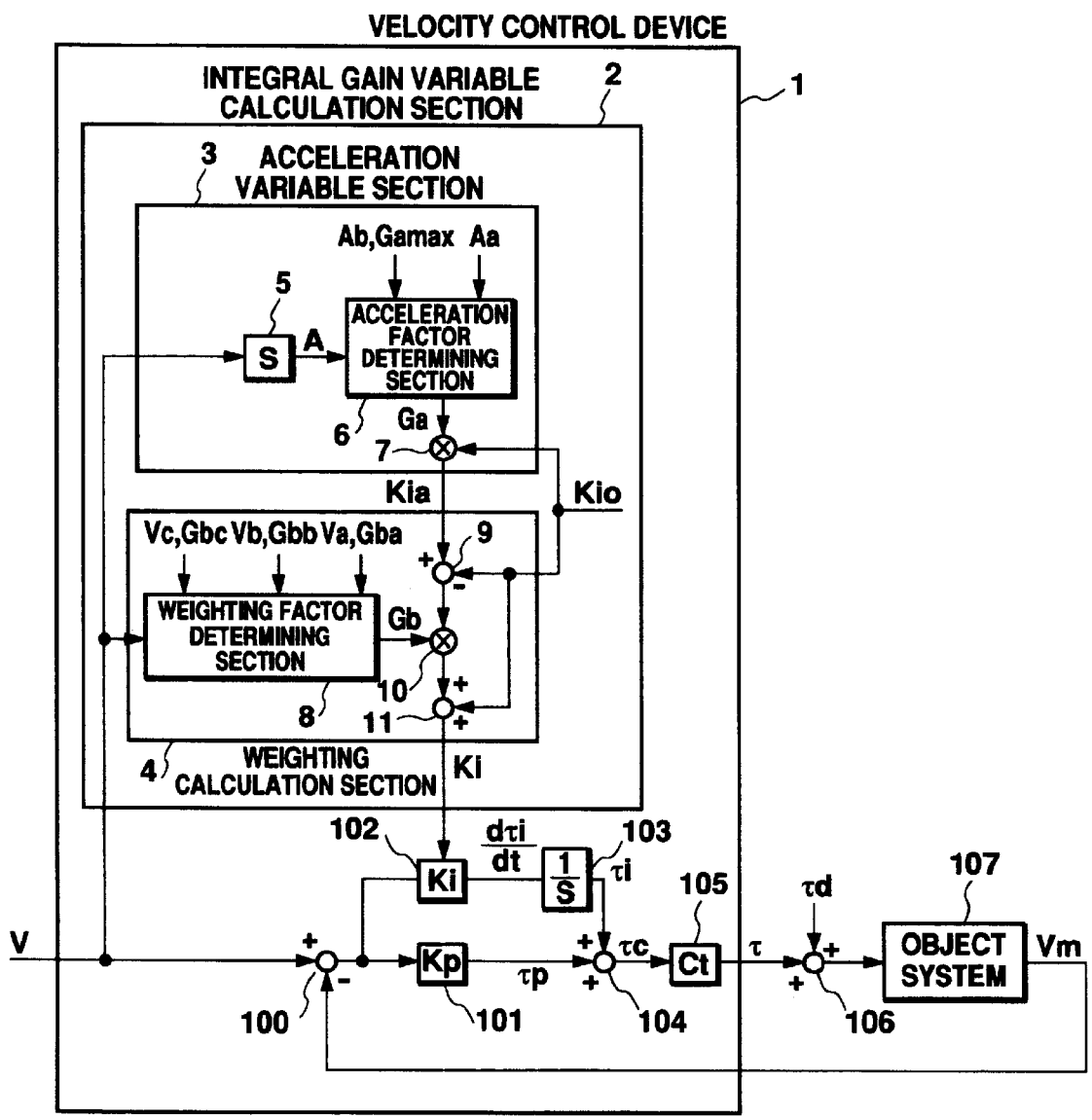
FIG. 1 is a block diagram showing one example of a velocity control device of the present invention.
Figure 6:
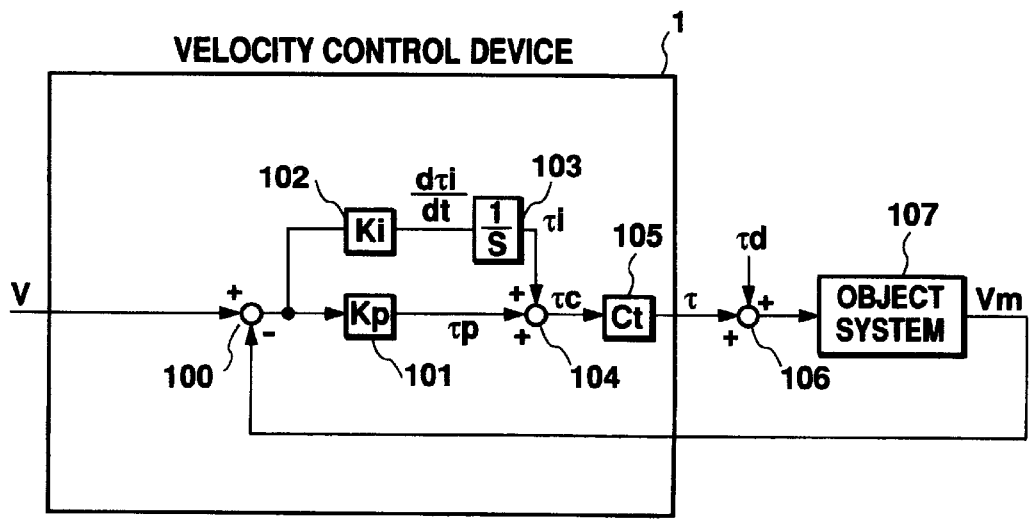
FIG. 6 is a block diagram showing one example of a conventional velocity control device.

FIG. 1 is one example of a block diagram of a velocity control device 1 in which the present invention is practiced. FIG. 1 corresponds to FIG. 6 of the conventional example and corresponding parts will be given the same names and reference numerals and their description will not be repeated. An integral gain variable calculation section 2 is composed of an acceleration variable section 3 and a weighting calculation section 4. First, the action of the acceleration variable section 3 will be described. A velocity command value V is differentiated in a differentiator 5, becomes an acceleration command value A, and is input into an acceleration factor determining section 6. The acceleration factor determining section 6 outputs an acceleration factor Ga after a calculation described later. A reference integral gain Kio is an integral gain which has initially been set into the velocity control device after being decreased with a margin so that a sufficiently stable action may be possible in all operational states of the velocity control device. The reference integral gain Kio is multiplied by the acceleration factor Ga in a multiplier 7 and becomes an acceleration variable integral gain Kia.

Figure 2:
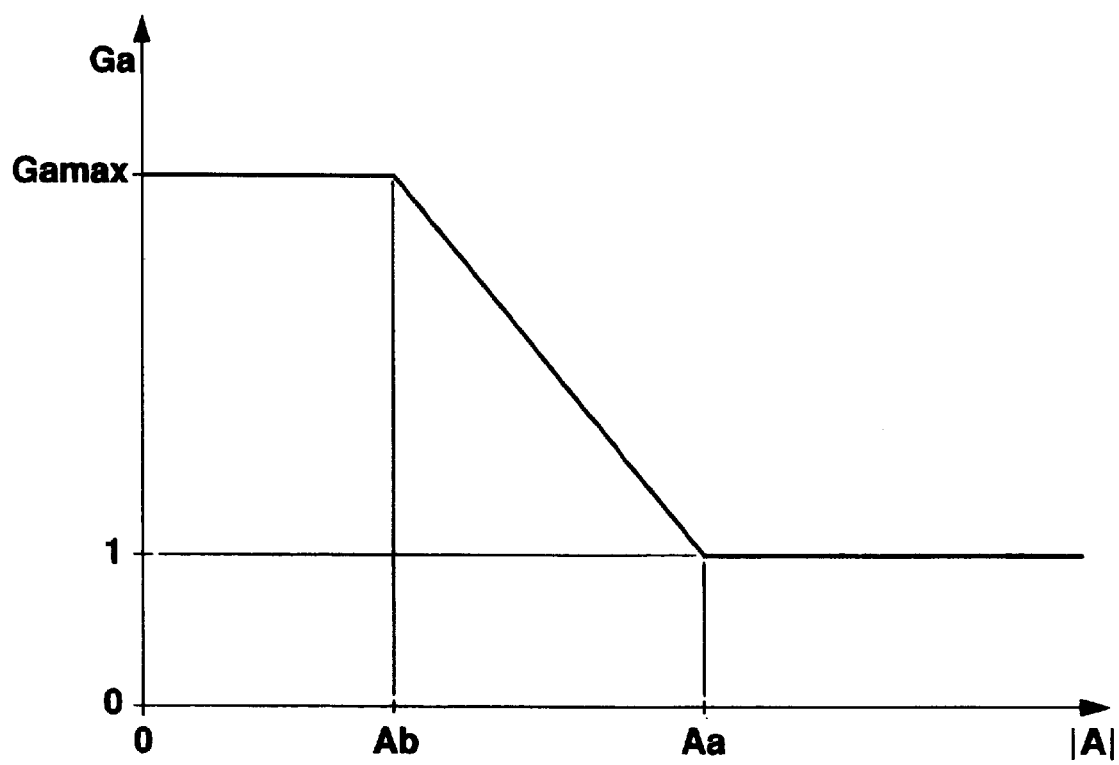
FIG. 2 is a graph describing an example of the action of an acceleration factor determining section 6 of the present invention.

FIG. 2 is a graph explaining an example of the action of the above mentioned acceleration factor determining section 6. The horizontal axis shows an absolute value $|A|$ of an acceleration command value A, while the vertical axis shows an acceleration factor Ga as an output of the acceleration factor determining section 6. A variable limit acceleration Aa on the high velocity when letting acceleration factor Ga=1, a variable limit acceleration Ab on the low velocity (wherein Aa>Ab holds), and a maximum acceleration factor Gamax employed at an acceleration of not more than Ab, are initially set in the acceleration factor determining section 6. The acceleration factor determining section 6 determines an acceleration factor Ga as an output by using these parameters, employing an absolute value $|A|$ of an acceleration command value A as an input, from the following relational expression.

Expressions 6
(in a case of $|A| \leq Ab$)

$$Ga=Gamax$$

(in a case of $Ab<|A| \leq Aa$)

$$Ga=1+(Gamax-1)(Aa-|A|)/(Aa-Ab)$$

(in a case of $|A|>Aa$)

$$Ga=1$$

Thus, in the acceleration factor determining section 6, an acceleration factor Ga having a tendency to increase with the decrease of $|A|$, is determined according to an absolute value $|A|$ of an acceleration command value A.

Next, the action of the weighting calculation section 4 will be described. The weighting factor determining section 8 outputs a weighting factor Gb by a calculation described later. A subtracter 9 is a subtracter which subtracts a reference integral gain Kio from an acceleration variable integral gain Kia, and this subtracter output is multiplied by the weighting factor Gb in a multiplier 10. The multiplier output is added to the reference integral gain Kio in an adder 11, and becomes an integral gain Ki finally employed at the time of velocity control calculation. The integral gain Ki is set in an amplifier 102 as an amplification factor of the amplifier 102. A series of above mentioned calculations to calculate an integral gain Ki are expressed by the following expression.
Expression 7

$$Ki=Kio+Gb(Kia-Kio)$$

Here, provided Gb is determined in the range of $0 \leq Gb \leq 1$, Ki=Kio holds when letting Gb=0, and Ki=Kia holds when letting Gb=1, and Ki approaches Kia from Kio as Gb approaches 1 from 0. That is, Gb is a weighting factor showing the degree of effects given by an acceleration variable integral gain Kia to an integral gain Ki.

Figure 3:
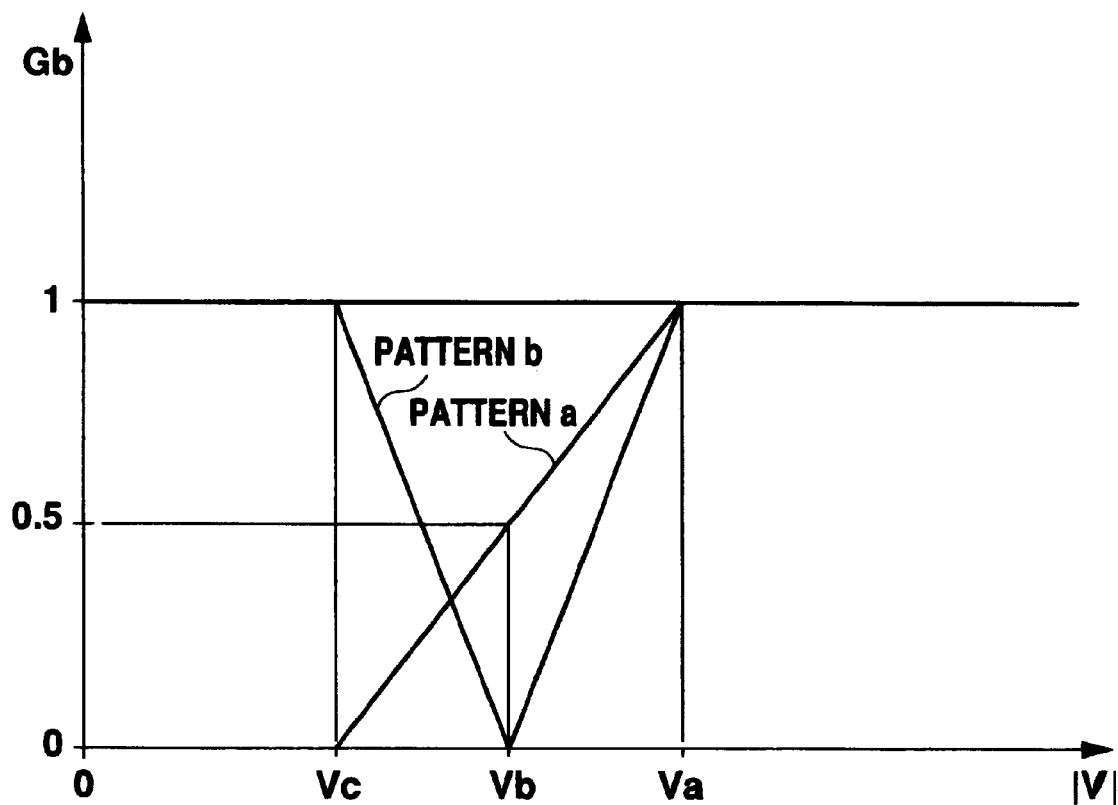
FIG. 3 is a graph describing an example of the action of a weighting factor determining section 8 of the present invention.

FIG. 3 is a graph explaining an example of the action of the above mentioned weighting factor determining section 8. The horizontal axis shows an absolute value $|V|$ of a velocity command value V, while the vertical axis shows a weighting factor Gb as an output of the weighting factor determining section 8. In the weighting factor determining section 8, 3 pieces of velocities Va, Vb, Vc (wherein Va>Vb>Vc holds) and weighting factors Gba, Gbb, Gbc respectively corresponding thereto are initially set. The weighting factor determining section 8 determines a weighting factor Gb as an output by using these parameters, by employing an absolute value $|V|$ of a velocity command value V as an input, from the following relational expression.
Expression 8
(in a case of $|V| \leq Vc$)

$$Gb=Gbc$$

(in a case of $Vc<|V| \leq Vb$)

$$Gb=Gbb+(Gbc-Gbb)(Vb-|V|)/(Vb-Vc)$$

(in a case of $Vb<|V| \leq Va$)

$$Gb=Gba+(Gbb-Gba)(Va-|V|)/(Va-Vb)$$

(in a case of $|V|>Va$)

$$Gb=Gba$$

For example, in a case when Pattern a [Vb=(Va+Vc)/2, Gba=1, Gbb=0.5, Gbc=0] is initially set, a weighting factor Gb approaches 1 and an integral gain Ki approaches an acceleration variable integral gain Kia, as an absolute value $|V|$ of a velocity command value V becomes larger. This becomes a setting for preventing induction of a swelling phenomenon, especially in a case where to set an integral gain Ki to be large, induces a swelling phenomenon in the area of low velocity. Next, in a case when Pattern b [Vb=(Va+Vc)/2, Gba 1, Gbb=0, Gbc=1] is initially set, a weighting factor Gb approaches 0 and an integral gain Ki approaches a reference integral gain Kio, at a position near the position [absolute value $|V|$ of a velocity command value V≈Vb]. This is effective for the countermeasures in a case when a swelling phenomenon of a specified frequency arises at a specified velocity.

Figure 4:
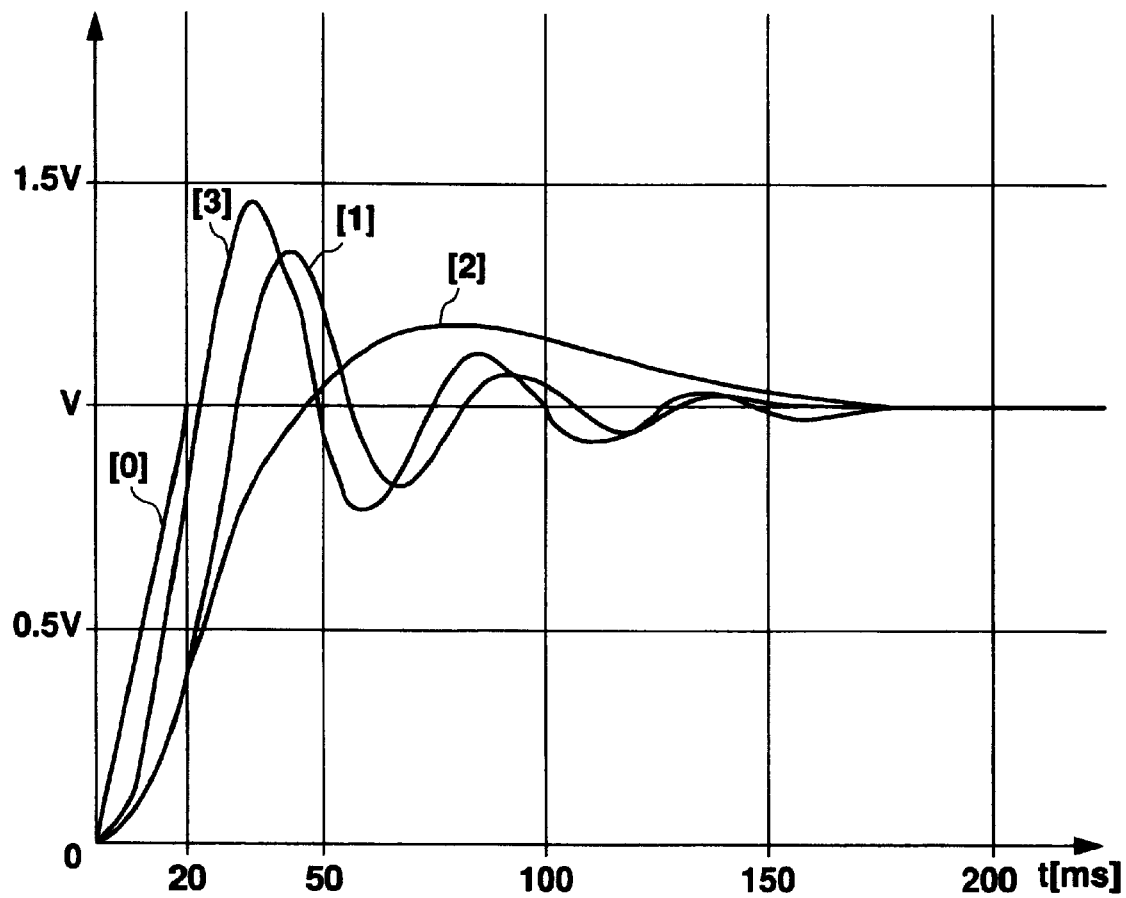
FIG. 4 is a graph showing real time response of velocity of a velocity control device according to the present invention and a conventional velocity control device.

FIG. 4 is a graph in which a comparison of real time response at the time of input of a velocity command value expressed by the following expression, is made between a velocity control device according to the present invention and a conventional velocity device.

Expression 9

$$V(t)=50Vt (0 \leq t \leq 20 \text{ ms})$$

$$V(t)=V (t>20 \text{ ms})$$

(wherein vm(0)=τi(0)=0 holds as initial conditions) [0] in FIG. 4 is a graph showing this velocity command value.

[2] and [3] in FIG. 4 are graphs showing real time response of a motor velocity vm to a velocity command of Expression 9 of a conventional velocity control device, and such an integral gain Ki and such a proportional gain Kp that a damping factor stand a natural frequency ωn of the system in Expression 3 may fulfill the following conditions, are set, respectively.

Condition of [2]: ζ=0.8, ωn=31.25

Condition of [3]: ζ=0.2, ωn=125

That is, [3] is the same as [2] in Kp, and is 16 times as much only in Ki. It is clear from this that if an integral gain Ki is set to be large so as to improve the disturbance suppression ability, as mentioned above, damping characteristics are worsened in command response characteristics.

[1] in FIG. 4 is a graph showing real time response of a motor velocity to a velocity command of Expression 9 of a velocity control device according to the present invention. In the present example, a reference integral gain Kio and a proportional gain Kp are set so that a damping factor ζ and a natural frequency ωn of the system in Expression 3 may fulfill the condition of said [2]. Furthermore, control parameters are arranged such that a maximum acceleration factor Gamax=16, a variable limit acceleration on the high side Aa<50 V, a variable limit acceleration on the low side Ab>0, and a weighting factor Gba=Gbb=Gbc=1. When a velocity command shown by Expression 9 is input into a velocity control device according to the present invention designed like this, a damping factor ζ and a natural frequency ωn of the system corresponding to the real time become as follows.

Condition of [1]: ζ=0.8, ωn=31.25 (0≤t≤20 ms) ζ=0.2, ωn=125 (t>20 ms)

In [1], an integral gain Ki is 16 times as much as that in [2] similar to that in [3], but it is clear that the amount of damping is improved, compared with that in [3].

Figure 5:
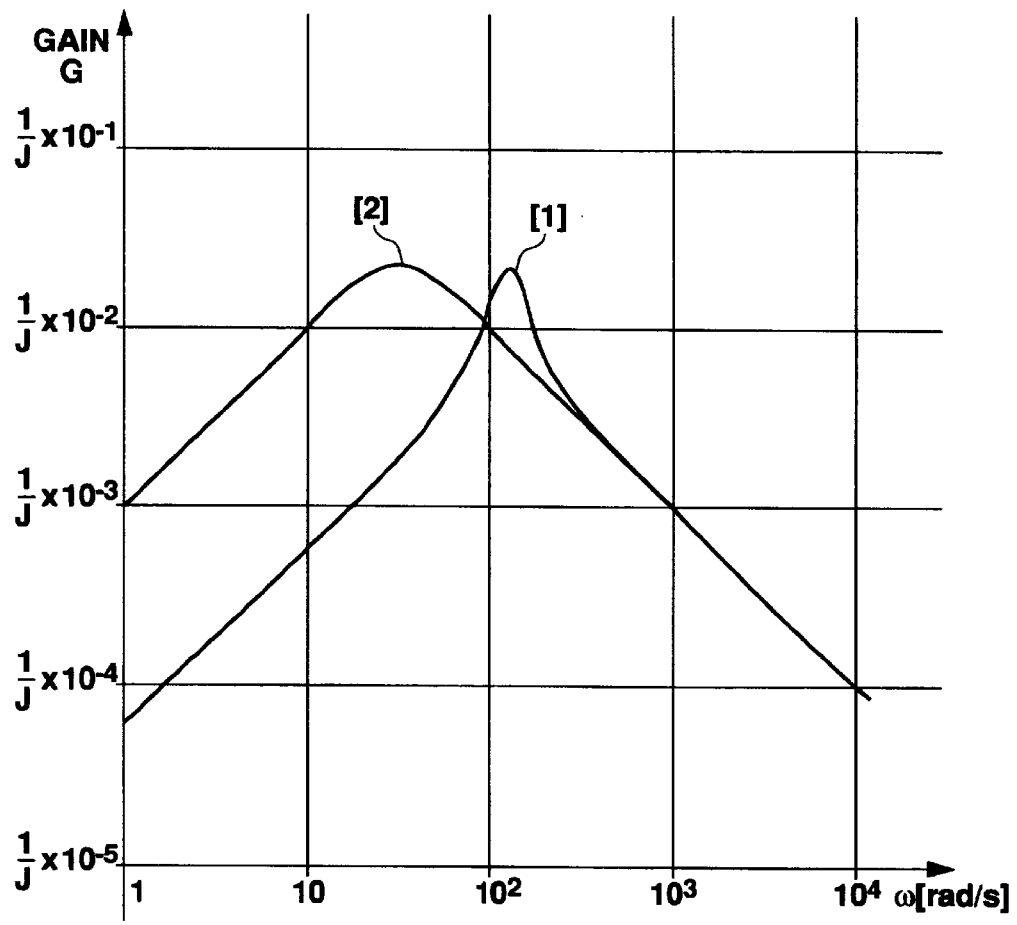
FIG. 5 is a graph showing disturbance suppression characteristics of a velocity control device according to the present invention and a conventional velocity control device.

FIG. 5 is a graph expressing disturbance suppression characteristics shown by Expression 5 under the condition of a constant velocity command value, for a velocity control device according to the present invention and a conventional velocity control device, and the horizontal axis is an angular frequency ω[rad/s], and the vertical axis is a gain G=vm (ω)/τd (ω), and both axes adopt logarithmic coordinates. [1], [2] agree with conditions of the same numerals in FIG. 4. It is clear from this that in a velocity control device according to the present invention, a disturbance suppression ability especially for a disturbance input of up to more than 10 Hz is approximately 16 times that of a conventional velocity control device.

As described above, a velocity control device according to the present invention includes an integral gain variable calculation section composed of an acceleration variable section which determines an acceleration factor according to an acceleration command value and calculates an acceleration variable integral gain from a reference integral gain and the acceleration factor, and a weighting calculation section which determines a weighting factor according to a velocity command value and determines a final integral gain from the reference integral gain, and said acceleration variable integral gain and weighting factor. Therefore, since a high integral gain can be set at a time excluding the time of acceleration or deceleration and the time of a specified constant velocity, the disturbance suppression ability can be improved under the conditions of low acceleration excluding a specified velocity and including a wide range of constant velocities, while relieving a damping phenomenon arising at the time of acceleration or deceleration and a swelling phenomenon of a specified frequency arising at a specified velocity.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A velocity control device which controls a velocity of an object via a servo motor according to a variable velocity command value, said velocity control device comprising an integral gain variable calculation section comprising an acceleration variable section for calculating an acceleration variable integral gain from a velocity command value and a reference integral gain and a weighting calculation section for calculating an integral gain at the time of velocity control calculation from the velocity command value, the reference integral gain, and the acceleration variable integral gain.

2. The velocity control device according to claim 1, wherein said acceleration variable section is arranged so as to calculate said acceleration variable integral gain by a differentiator which obtains an acceleration command value from said velocity command value, an acceleration factor determining section which determines an acceleration factor according to the acceleration command value, and a multiplier which multiplies said reference integral gain and the acceleration factor together.

3. The velocity control device according to claim 1, wherein said weighting calculation section is arranged so as to calculate an integral gain at the time of said velocity control calculation by a weighting factor determining section which determines a weighting factor according to said velocity command value, a subtracter which detects a difference between said acceleration variable integral gain and said reference integral gain, a multiplier which multiplies the subtracter output and the weighting factor together, and an adder which adds the multiplier output and said reference integral gain together.

* * * * *